Patented Sept. 18, 1934

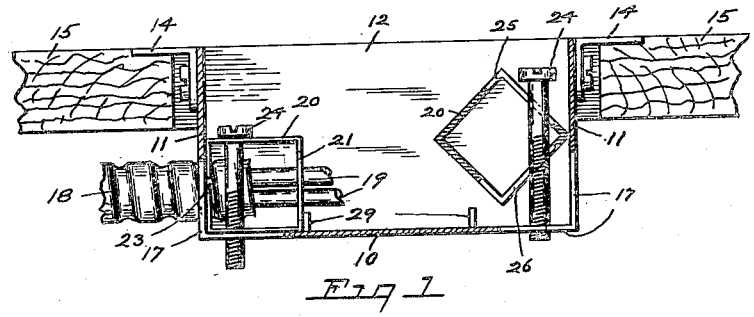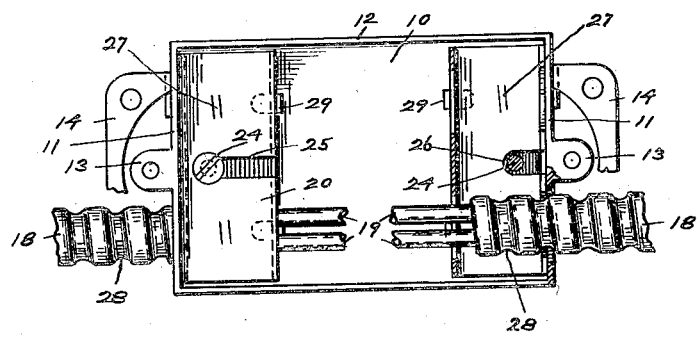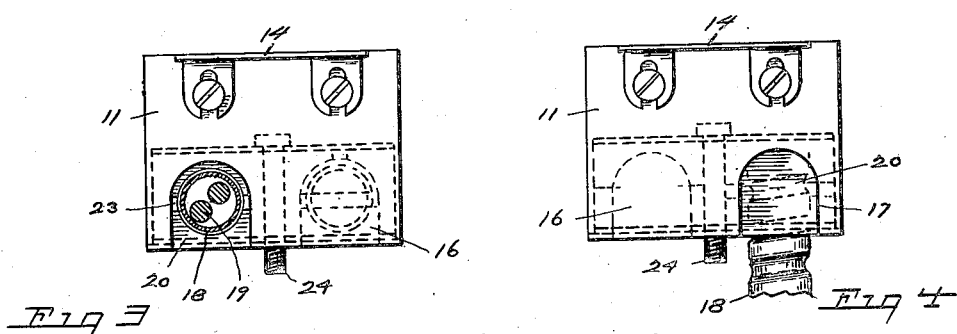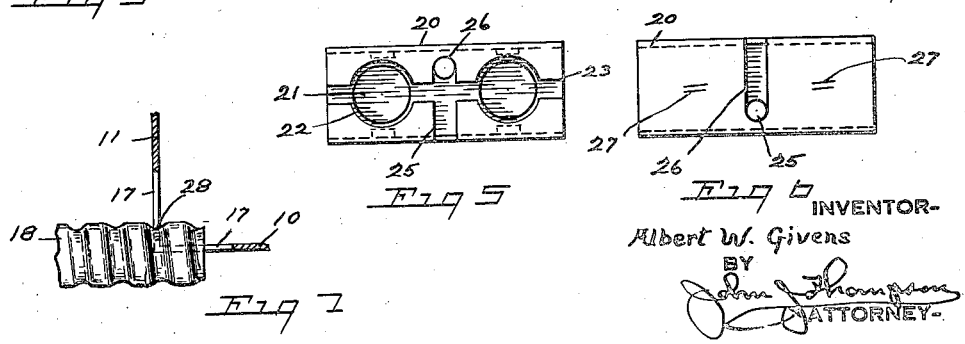

1,974,268

UNITED STATES PATENT OFFICE 1,974,268

OUTLET BOX AND CLAMP THEREFOR

Albert W. Givens, Marlborough, N. Y.

Application April 5, 1933, Serial No. 664,476

1 Claim. (Cl. 247—24)

This invention relates to outlet boxes, such as those used for switches, receptacles, ceiling stud boxes and the like where the usual BX cable terminates and is secured in electrical installations, both new and old.

The boxes now in use for this purpose are made from sheet metal in different shapes and sizes, and are provided with several knock-out or semi-punched portions that may readily be removed to form an opening for the BX cable and they are located in the ends, or sides and bottom of the boxes, and the BX or armored cable is secured within and to the box by a suitable clamp.

In the installing of these boxes, especially in old houses where the wires or cables are more or less concealed by the walls, and where the opening wherein the box is mounted is of about the same size as the box, it is very difficult for the workman to thread the cables into the holes in the box, especially if cables are to be entered from different directions, as from the top and bottom, or in the two ends, as the cables must be first drawn through the opening, threaded into the box and the clamps and then the box located within the opening.

Also in the old style boxes, the clamps must be positioned either for the bottom holes or the side or end holes, and to do this the clamping screw must be removed, the clamp turned to the proper position and the screw replaced, all of which requires great skill and time after the box is in place in the wall.

The object of the invention is to provide an outlet box formed of sheet metal and constructed in such a manner that the knock-out portions forming the holes are formed in the edges of the box, so that when removed a hole is left both in the side and bottom of the box, an L-shaped piece having been removed from the box, thus providing an opening through which a cable may be entered from either the side of the box or from the bottom of the box as is required.

Another object of the invention is to provide a clamp for the cable, that is attached to the box by a clamping screw, and so constructed, that by loosening the screw, the clamp may be turned over or rocked to register either with the side or the bottom hole, without removing the clamp from the box.

A further object is to provide a clamp that will by the action of the screw be gripped upon the cable, and not clamp the cable between the clamp and the box.

Another object is to provide a clamp that will when in place upon the cable fully close the opening in the box to prevent plaster, dirt, etc. from entering the box.

Another object being that the cables may be entered into the holes in the box without drawing them from the wall and without requiring a much larger opening in the wall than the size of the box, in the installation being accomplished in much less time than now is required.

With these and other objects in view, my invention consists in certain novel construction and combination of parts as will hereinafter be fully described and claimed, and illustrated in the accompanying drawing which forms a part hereof, and in which like figures of reference refer to corresponding parts in all of the views, but it is understood that slight changes may be made without departing from the spirit of the invention.

In the drawing:—

Figure 1, shows a sectional view of a box mounted in the wall, and showing one clamp holding a cable in place, while the clamp in the opposite end of the box is in the act of being turned or swiveled from one position to the other.

Figure 2 is a top plan view of the box, partly in section, to illustrate the clamp and its operation.

Figure 3 shows an end view of the box, with one cable entering the end of the box.

Figure 4 is a similar view of the box, but showing the cable entering the bottom thereof.

Figure 5 is a detail view of the clamp, showing the gripping side thereof.

Figure 6 is a similar detail view of the clamp, showing the other side thereof.

Figure 7 shows the end of the cable, and the manner in which the same is entered into the hole in the box.

Referring to the drawing—

The box is constructed of sheet metal or other suitable material and as here shown has the bottom 10, ends 11 and sides 12 integral, but the sides 12 may be detachable so that several boxes may be secured together side by side to form a gang box. The upper ends 11 are formed with the attaching ears 13, and the ends 11 are provided with the flanged members 14 by which the box is mounted to the wall casing 15, but these features may be varied to suit different conditions and have no bearing on the invention.

Said box is formed with the indicated semi-punched knock-out plugs 16 which are L-shaped and are formed from both the bottom and end on the edges of the box, and the desired one or more may be readily removed leaving a hole 17 for the reception of the cable 18, containing the wires 19.

The clamp comprises a tubular member 20, here shown as square in cross section, but which may be of other desired shapes, and in one side thereof are formed two holes 21 that will register with the openings 17 in the box, either in the end 11 or bottom 10, and in the opposite side of the clamp 20 are also formed corresponding holes 22 of slightly larger diameter than the holes 21, and all of these holes may have rolled edges to protect the cable and wires.

The side of this clamp having the larger size holes is designated as the clamping side, and is provided with a longitudinal slot 23 extending from end to end and dividing this side into two parts that may be forced together upon the cable 18 by the clamp screw 24 which passes through two transverse slots 25 and 26 formed in the sides of the clamp midway between the holes.

These slots 25 and 26 enabling the clamp to be turned sidewise upon the screw 24 which is threaded into the bottom 10 of the box, thus bringing the clamping side of the clamp into contact and registry either with the holes in the end of the box or those in the bottom of the box as the case may be.

The top and bottom sides of the clamp are also provided with the tits 27 which enter the groove 28 in the cable and help to hold it in place, while the upper and lower parts of the clamping face or side also enter the groove 28.

When the clamp is secured in position within the box and in gripping relation with the cable 18, the sides of the clamp will completely close the opening in both the ends and bottom of the box around the cable and whichever part of the hole the cable is not entered in, thus closing the box.

It is understood that in all of the views, the cover plate has been removed from the box, and is not shown.

The parts 29 shown in the drawing are lips struck up or punched from the bottom of the box for the purpose of locating the clamp.

Having thus described my invention, what I claim as new and desire to secure by Letters Patent, is—

An outlet box having, in combination, a pair of adjoining walls each having a knock-out hole adjacent their intersection, a box-shaped clamping member formed with a cable openings and shiftably mounted in said outlet box to permit the insertion of a cable through said knock-out hole in either of said walls and through said clamp, a clamp screw passing through said clamping member and threaded into the bottom of said box, and portions of said clamping member so arranged that when brought into clamping engagement with the cable and the box, one face completely closes the unused hole in said box, and means whereby said clamping member may be shifted within said box and upon the clamping screw without removing said screw.

ALBERT W. GIVENS.